Aug. 8, 1950  J. G. REID, JR  2,518,180
ABSORPTION REFRIGERATING SYSTEM WITH
ABSORBENT CONCENTRATION CONTROL
Filed Dec. 2, 1944  2 Sheets-Sheet 1

INVENTOR
John G. Reid, Jr.
BY
Oliver S. Titcomb
ATTORNEY

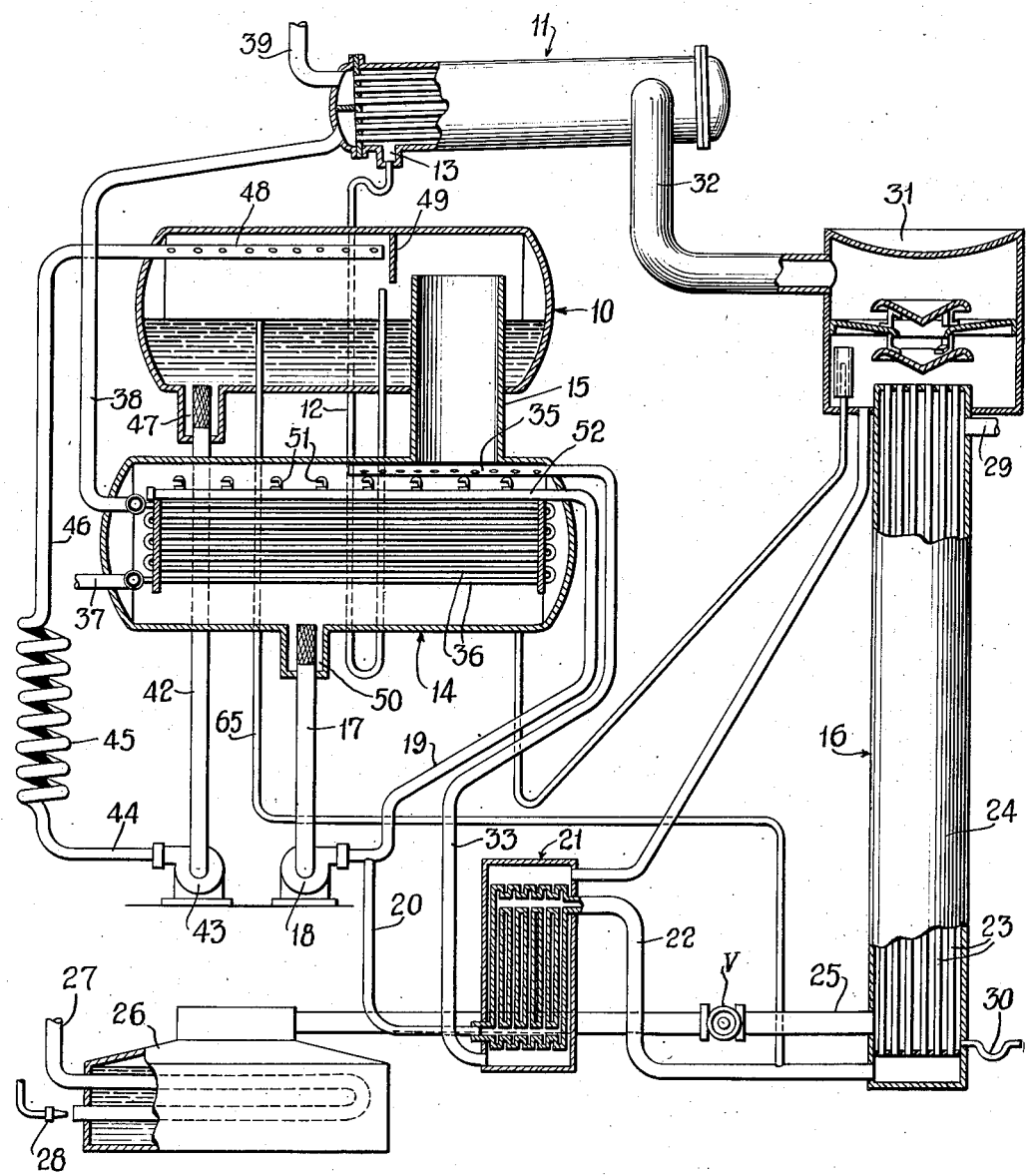

Patented Aug. 8, 1950

2,518,180

UNITED STATES PATENT OFFICE 2,518,180

ABSORPTION REFRIGERATING SYSTEM WITH ABSORBENT CONCENTRATION CONTROL

John G. Reid, Jr., Evansville, Ind., assignor to Servel, Inc., New York, N. Y., a corporation of Delaware Application December 2, 1944, Serial No. 566,290

10 Claims. (Cl. 62—119)

The present invention relates to a method of and apparatus for controlling the condition of the absorbent in an absorption refrigeration system utilizing a solid absorbent in solution.

While the present invention may be applied to other absorption refrigeration systems it is particularly adapted for use in a system of the type illustrated and described in the application for United States Letters Patent of Albert R. Thomas Serial No. 560,214, filed October 25, 1944, entitled "Refrigeration." The refrigeration system illustrated and described in the Thomas application operates in a partial vacuum and utilizes water as a refrigerant and a saline solution as an absorbent. The refrigerant and absorbent are introduced into the system as a water solution of a salt such as lithium chloride, lithium bromide, or the like and the absorbent occurs in the system as a dilute or concentrated water solution of the salt.

The system includes an evaporator for maintaining a pool of liquid refrigerant and an auxiliary loop circuit including a cooling device for circulating the liquid refrigerant in the evaporator to cool at a place remote from the evaporator. Without some means of control, the concentration of the absorption or salt solution will increase in proportion to the amount of liquid refrigerant which accumulates in the evaporator. If the concentration of the absorption solution increases to the point of saturation at temperatures prevailing in the liquid circuit, the salt will crystallize and precipitate out of the solution. Such crystallization and precipitation of salt will interfere with the proper operation of the system.

One of the objects of the present invention is to control the concentration and temperature of the absorption solution to prevent crystallization and precipitation of solid absorbent from the solution.

Another object is to control the concentration of the absorption solution by limiting the amount of liquid refrigerant which can accumulate in the evaporator.

Another object is to provide a bypass between the evaporator and another part of the system which is operable automatically to drain liquid refrigerant from the evaporator when it rises to a predetermined level therein.

Still another object is to control the temperature of the absorption solution by heating it with a heating medium at a predetermined fixed temperature.

These and other objects will become more apparent from the following description and drawings in which like reference characters denote like parts throughout the several views. It is to be expressly understood, however, that the drawings are for the purpose of illustration only and not a definition of the limits of the invention, reference being had for this purpose to the appended claims.

In the drawings:

Fig. 3 is a view similar to Fig. 1 showing a bypass conduit of a modified construction connected between the evaporator and a portion of the system adjacent the base of the generator.

Figures 1, 2:
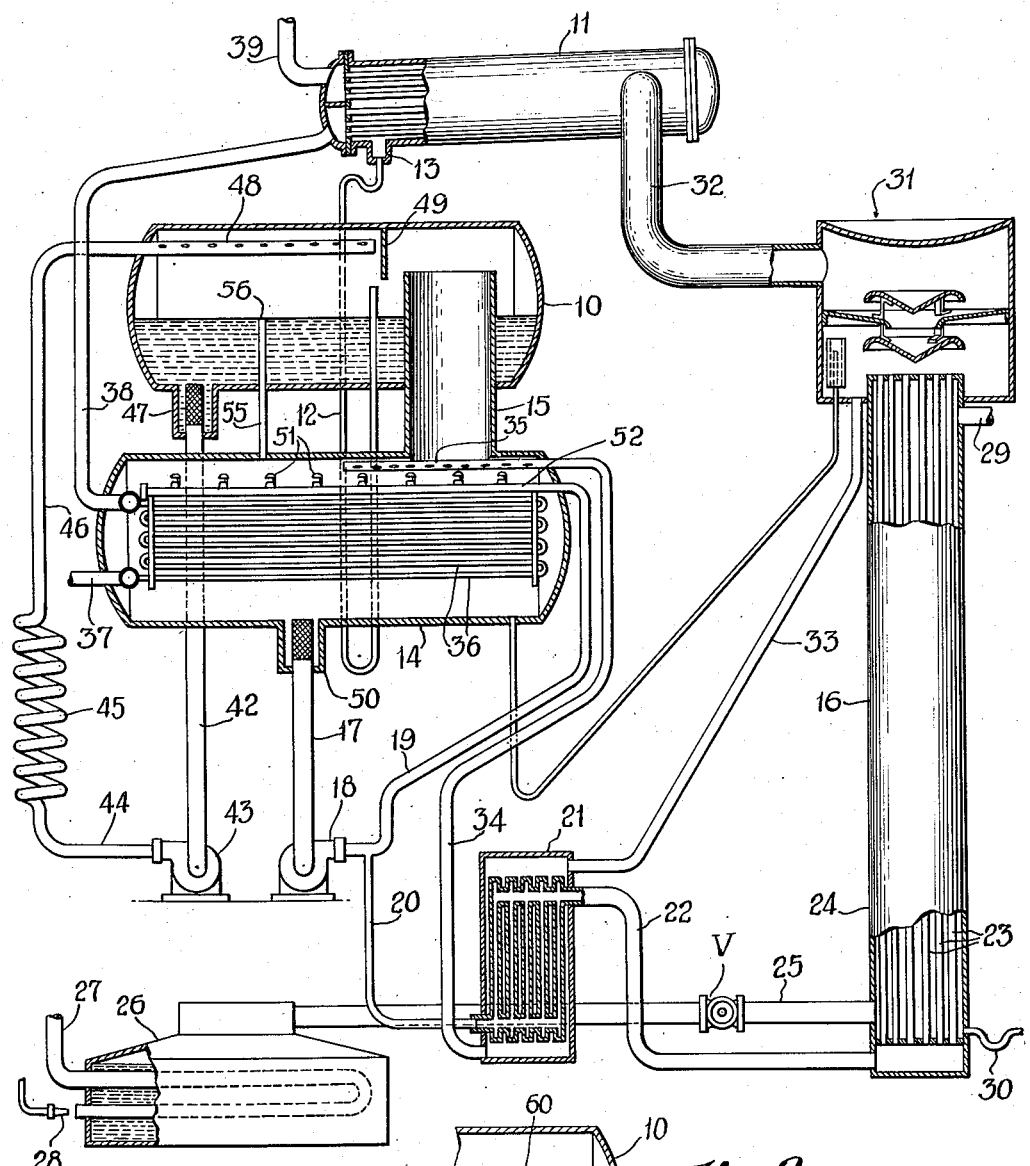
Fig. 1 is a diagrammatic view of an absorption refrigeration system incorporating the novel features of the present invention and showing the atmospheric steam heating system to control the temperature of the absorption solution and the bypass conduit connecting the evaporator and absorber to control the concentration of the absorption solution.
Fig. 2 is a partial view of the evaporator showing a bypass of modified construction comprising an opening in the side of the standpipe in the evaporator.

The method of the present invention comprises the steps of controlling the temperature of the absorption solution to maintain the temperature substantially constant at any particular point in its path of flow and controlling the concentration of the absorption solution to maintain it within permissible limits. The temperature of the absorption solution may be controlled in accordance with the present invention by heating it in the generator at a constant temperature with steam at atmospheric pressure. As the temperature differential between the generator and absorber is substantially constant during the operation of the refrigeration system the temperature of the liquid at any particular point in its path of flow will be substantially constant. The concentration of the absorption solution is maintained within permissible limits by draining excessive refrigerant supplied to the evaporator after a predetermined amount has accumulated therein. By controlling the temperature and concentration of the absorption solution crystallization and precipitation of solid absorbent from the solution is prevented. Furthermore in accordance with the present method the boiling point of the absorption solution supplied to the generator may be maintained well below the temperature of the heating medium in the generator.

In the absorption refrigeration system illustrated in Fig. 1 of the drawings liquid refrigerant such as, for example, water is introduced into the evaporator 10 from a condenser 11 through a path of flow including a U-shaped tube 12. The evaporator 10 is in the form of a horizontally arranged cylindrical drum and the U-shaped tube 12 has one end connected to a sump 13 at the bottom of the condenser 11 and its opposite end extending upwardly through the bottom of the evaporator. The refrigerant vapor formed in the evaporator 10 flows to an absorber 14 where the vapor is absorbed in a liquid absorbent such as, for example, a concentrated water solution of lithium chloride or lithium bromide. The absorber 14 is also in the form of a horizontally arranged cylindrical drum positioned directly below the evaporator 10. A pipe 15 extends upwardly from the top of the absorber 14 through the bottom of the evaporator 10 and for a considerable distance above the bottom to provide a standpipe in the evaporator. The standpipe 15 is adapted to exhaust refrigerant vapor from the evaporator 10 to the absorber 14 while maintaining a body of liquid refrigerant in the evaporator.

Absorption liquid enriched with refrigerant or, in other words, a dilute salt solution is conducted from the absorber 14 to the base of a generator 16 in a path of flow including a conduit 17, pump 18, conduits 19 and 20, liquid heat exchanger 21 and conduit 22. The generator 16 comprises a plurality of riser tubes 23 enclosed by an outer shell 24 to provide a chamber therebetween. Atmospheric steam at 212 degrees F., is supplied to the chamber in the generator 16 from a boiler 26 through a conduit 25. For purposes of illustration, a manually operable valve V is shown in the conduit 25 for controlling the amount of steam supplied to the generator 16 but it will be understood that a suitable automatically operable valve may be substituted for controlling the amount of steam in accordance with the load. The boiler 26 is provided with fire tubes 27 to which heat is supplied from a suitable fuel burner 28. An outlet vent 29 is provided adjacent the upper end of the steam chamber in the generator 16 to maintain the steam at atmospheric pressure and a condensate return line 30 is provided adjacent the base thereof. The heating of the riser tubes 23 by the steam causes refrigerant vapor to be expelled from the absorption solution and such expelled vapor is effective to raise the absorption solution in the tubes by gas or vapor lift action. The expelled vapor passes from the upper ends of the riser tubes 23 into a vapor separator 31 and thence flows through a conduit 32 to the condenser 11 where the vapor is liquefied. Liquid refrigerant formed in the condenser 11 flows through the U-shaped tube 12 to the evaporator 10, as explained above, to complete the refrigeration cycle.

The raised absorption solution from which refrigerant vapor has been expelled is conducted from the upper portion of the generator 16 to the absorber 14 in a path of flow including a conduit 33, liquid heat exchanger 21 and conduit 34. The end of the conduit 34 extends into the upper portion of the absorber 14 adjacent the inlet from the standpipe 15 and has a plurality of apertures or nozzles therein to provide a distributing pipe 35 for dividing the absorption solution as it is introduced into the absorber to promote absorption of the refrigerant vapor. The heat liberated by the absorption of refrigerant vapor in absorber 14 is taken up by a cooling medium such as, for example, water which flows upwardly through vertically disposed banks of pipes or coils 36 in the absorber. The cooling water is introduced into the lower ends of the banks of pipes 36 from a supply main 37 and is discharged from the upper ends of the banks of pipes through a conduit 38. Conduit 38 is connected to the condenser 11 so that the cooling water also may be utilized to effect cooling of the condenser. The cooling water is discharged from the condenser 11 through a conduit 39.

The system operates in a partial vacuum with the generator 16 and condenser 11 operating at one pressure and the evaporator 10 and absorber 14 operating at a lower pressure. The pressure differential between the high and low pressure sides of the system is maintained by a liquid column in the up-leg of the U-shaped tube 12 between a condenser 11 and evaporator 10. A similar liquid column also is present in the conduit 34 connecting the absorber 14 and liquid heat exchanger 21. The pump 18 connected between the absorber 14 and liquid heat exchanger 21 also maintains the pressure differential between the absorber and generator 16.

The liquid refrigerant in the evaporator 10 is circulated continuously in a loop circuit to adapt the system to refrigerate at a place remote from the evaporator. The loop circuit comprises a conduit 42, pump 43, conduit 44, cooling element 45 and conduit 46. The conduit 42 has one end extending into a sump 47 at the bottom of the evaporator 10 to receive liquid refrigerant therefrom and its opposite end is connected to the pump 43. The conduit 44 is connected between the outlet from the pump 43 and the inlet to the cooling element 45 while the conduit 46 is connected between the outlet from the cooling element and the upper part of the evaporator 10. The cooling element 45 is illustrated diagrammatically as a cooling coil but it will be understood that this element may have other forms such as a radiator or the like depending upon the particular installation. As illustrated in Fig. 1 of the drawings, the end of the conduit 46 extends into the evaporator 10 and has a series of apertures or nozzles to provide a liquid distributing pipe 48 for dividing the liquid refrigerant as it is returned to the evaporator to promote evaporation. Preferably, a baffle plate 49 is provided in the evaporator 10 between the end of the liquid distributing pipe 48 and the standpipe 15 to prevent the liquid refrigerant from being swept into the standpipe with the refrigerant vapor.

The absorption solution in the absorber 14 also is circulated continuously through an auxiliary loop circuit to promote absorption of the refrigerant vapor. The auxiliary loop circuit for the absorption solution comprises the conduit 17, pump 18 and conduit 19. The upper end of the conduit 17 extends into a sump 50 in the bottom of the absorber 14 and the lower end of the conduit is connected to the inlet of the pump 18. Conduit 19 is connected at one end to the outlet from the pump 18 and its opposite end extends throughout the length of the absorber 14 adjacent the top thereof. A series of nozzles 51 are provided in the end portion of the conduit 19 extending into the absorber 14 to provide a liquid distributing pipe 52 for dividing the absorption liquid into a fine spray as it is delivered to the absorber. During operation of the refrigeration system, part of the circulating absorption solution is diverted from the conduit 19 through the conduit 20 and liquid heat exchanger 21 to the generator 16 as previously described.

With the absorption refrigeration system as thus far described, the amount of liquid refrigerant in the evaporator 10 will vary in accordance with the load. If the refrigerant circulating in the auxiliary loop circuit including the cooling element 45 evaporates at a rate equal to or greater than the rate at which it is delivered to the evaporator 10 the same or a decreasing amount of refrigerant will be present in the evaporator. The refrigerant vaporized in the evaporator 10 will be absorbed in the absorption solution in the absorber 14 to maintain the concentration of the absorption solution within permissible limits. However, if the amount of refrigerant evaporated in the evaporator 10 is less than the amount of refrigerant delivered to the evaporator from the condenser 11 the liquid refrigerant will accumulate in the evaporator. Such progressive accumulation of the liquid refrigerant in the evaporator 10 will cause a progressive concentration of the absorption solution until the saturation point at the temperature in the liquid circuit is reached at which time crystallization and precipitation of salt will occur. The occurrence of crystallized salt in the system is apt to plug the lines preventing circulation and the increased concentration is apt to increase the boiling temperature of the solution to a value at which the heating steam is ineffective to expel refrigerant vapor therefrom. Furthermore, in some instances the absorption liquid will not boil even when heated above the boiling temperature of the liquid. This phenomena is known as "superheating." Therefore, the concentration of the absorption liquid should be maintained below a predetermined maximum corresponding to a boiling temperature of the absorption solution below the temperature of the steam heating medium.

In accordance with the present invention the temperature and concentration of the absorption solution are controlled to prevent precipitation of solid absorbent from the solution and superheating in the generator 16. The temperature of the absorption solution is controlled by heating it in the generator 16 with steam at atmospheric pressure and a constant temperature of 212 degrees F. Thus the temperature of the solution flowing between the generator and absorber is maintained substantially constant at any particular point in its path of flow.

The means illustrated in Fig. 1 of the drawings for controlling the concentration of the absorption solution comprises a bypass conduit 55 between the evaporator 10 and absorber 14. The conduit 55 is connected at its lower end to the top of the absorber 14 and extends upwardly through and above the bottom of the evaporator 10. The upper end 56 of the bypass conduit 55 is positioned at a predetermined height above the bottom of the evaporator 10 so that when the liquid refrigerant rises to a level above the end it will overflow into the absorber 14. The height of the by-pass conduit 55 above the bottom of the evaporator 10 is determined by the amount of refrigerant which can be diverted from the absorption solution while maintaining the concentration of the solution within permissible limits at the lowest temperature in the liquid circuit.

If liquid refrigerant is delivered to the evaporator 10 at a faster rate than the rate of evaporation therein, the liquid refrigerant will tend to accumulate in the evaporator and the liquid level will gradually rise. When the liquid refrigerant in the evaporator 10 rises to a level above the end 56 of the by-pass conduit 55, it will overflow through the conduit and be delivered to the absorber 14. The overflowing liquid refrigerant then dilutes the absorption solution to maintain the concentration within permissible limits as determined by the maximum amount of refrigerant in the evaporator 10 when overflow occurs. Thus, by properly proportioning the height of the overflow conduit 55 above the bottom of the evaporator 10 the concentration of the absorption solution may be maintained at a value to prevent crystallization and precipitation of salt from the solution at the lowest temperature occurring in its path of flow.

In Fig. 2, a bypass of modified construction is illustrated. In this form of construction, the standpipe 15 is provided with an opening or hole 60 in its side wall at a predetermined height above the bottom of the evaporator 10. The hole 60 in the standpipe 15 operates in the same manner as the bypass conduit 55 in the form of construction illustrated in Fig. 1. When the liquid refrigerant rises in the evaporator 10 to a level above the hole 60, the liquid refrigerant will overflow through the standpipe 15 and be delivered to the absorber 14. The overflowing liquid refrigerant is absorbed to dilute the absorption solution in the absorber 14 and maintain the concentration of the solution within permissible limits.

In Fig. 3 a concentration control of further modified construction is illustrated by which excessive liquid refrigerant in the evaporator 10 is delivered to the system at a point adjacent the base of the generator 16. The refrigeration system illustrated in Fig. 3 is identical with the system illustrated in Fig. 1 and includes a generator 16, condenser 11, evaporator 10, absorber 14, and conduits interconnecting the elements to provide circuits for the refrigerant and absorbent. In the arrangement illustrated in Fig. 3, however, a by-pass conduit 65 is provided which extends between the evaporator 10 and conduit 22 connecting the heat exchanger 21 to the base of the generator 16. The upper end of the bypass conduit 65 extends through the bottom of the evaporator 10 and to a predetermined height above the bottom thereof corresponding to the amount of liquid refrigerant which may accumulate in the evaporator without excessively increasing the concentration of the absorption solution.

With the modified construction illustrated in Fig. 3 liquid refrigerant overflowing from the evaporator 10 through the bypass conduit 65 is delivered to the generator to dilute the absorption solution supplied thereto. Such dilution of the absorption solution in the generator 16 reduces the temperature at which refrigerant vapor is expelled from the absorption solution to promote boiling of the solution and is particularly effective in avoiding superheating in the generator.

It will now be observed from the foregoing description that the present invention provides a novel construction and arrangement of elements to control the concentration of the absorption solution. It will also be observed that the present invention provides for bypassing liquid refrigerant from the evaporator to another part of the system when the liquid refrigerant rises to a predetermined level in the evaporator. It will still further be observed that the present invention provides for delivering the liquid refrigerant to the base of the generator to prevent superheating in the generator.

While several forms of construction of the invention are herein illustrated and described it is to be understood that further modifications may be made in the construction and arrangement of the elements without departing from the spirit or scope of the invention. Therefore without limiting myself in this respect reference is to be had to the appended claims for a definition of the limits of the invention.

What is claimed is:

1. In an absorption refrigeration system having an evaporator and an absorber, a generator and a condenser constructed and arranged for supplying liquid refrigerant to said evaporator at a rate in excess of the rate of evaporation in the evaporator, a local circuit for recirculating the excess liquid refrigerant through the evaporator, and a device for limiting the amount of said excess liquid refrigerant in the evaporator while permitting variation in pressure in the system with variation in load conditions.

2. In an absorption refrigeration system, a generator, a condenser, an evaporator, an absorber, conduits connecting the elements to provide circuits for the circulation of refrigerant and absorbent, a source of heat, means for controlling the heating of said generator by heat from said source, an auxiliary circuit including said evaporator, means to maintain a pool of unevaporated liquid refrigerant from the evaporator, and a pump for circulating liquid refrigerant, and a by-pass conduit connected and arranged to drain liquid refrigerant from the pool to another part of the system when the liquid in the pool rises to a predetermined level.

3. In an absorption refrigeration system a generator, a condenser, an evaporator, an absorber, conduits connecting the elements to provide circuits for the circulation of a refrigerant and absorbent, said evaporator being so constructed and arranged as to maintain a pool of liquid refrigerant therein, an auxiliary loop circuit including a pump and cooling element for circulating the liquid refrigerant in the evaporator, a bypass conduit having its end positioned above the bottom of the evaporator for draining liquid refrigerant from the evaporator to another part of the system when the liquid refrigerant rises to a predetermined level in the evaporator, and a source of heat for heating the liquid in the generator at a predetermined constant temperature.

4. An absorption refrigeration system comprising a plurality of elements interconnected to provide circuits for the circulation of a refrigerant and absorbent, said system operating in a partial vacuum and utilizing water as a refrigerant and a salt solution as an absorbent, a generator in said system, means for heating the liquid in said generator at a constant predetermined temperature, an evaporator vessel in said system adapted to maintain a pool of liquid refrigerant therein, means for recirculating liquid refrigerant from the bottom to the top of the evaporator vessel, and means for controlling the concentration of the salt solution in the system comprising a bypass conduit having one end connected to the evaporator above the bottom thereof for draining liquid refrigerant from the evaporator to another part of the system when the liquid refrigerant rises to a predetermined level in the evaporator.

5. An absorption refrigeration system comprising a plurality of elements interconnected to provide circuits for the circulation of a refrigerant and absorbent, said system operating in a partial vacuum and utilizing water as a refrigerant and a salt solution as an absorbent, a generator in said system, a boiler for supplying steam to the generator at atmospheric pressure to heat the liquid in the generator at a constant temperature, an evaporator in said system adapted to maintain a pool of liquid refrigerant therein, an auxiliary loop circuit including a pump and cooling element for circulating the liquid refrigerant in the evaporator, and means for controlling the concentration of the salt solution in the system comprising a bypass conduit extending into the evaporator and having an opening at a predetermined height above the bottom of the evaporator, said bypass conduit being connected to another part of the system whereby liquid refrigerant overflows from the evaporator to the other part of the system to dilute the absorption solution after a predetermined amount of liquid refrigerant accumulates in the evaporator.

6. In an absorption refrigeration system a generator, a condenser, an evaporator and an absorber, conduits connecting the elements to provide circuits for the circulation of a refrigerant and absorbent, said system operating in a partial vacuum and utilizing water as a refrigerant and a salt solution as an absorbent, a source of heat for heating liquid in the generator at a constant temperature, means for recirculating liquid refrigerant in the evaporator from the bottom to the top thereof, and means for controlling the concentration of the absorption solution comprising a bypass positioned above the bottom of the evaporator for draining liquid refrigerant from the evaporator to the absorber when the liquid refrigerant rises to a predetermined level in the evaporator.

7. In an absorption refrigeration system, a generator, a condenser, an evaporator, an absorber, conduits interconnecting the elements to provide circuits for the circulation of a refrigerant and absorbent, said evaporator overlying the absorber, a standpipe extending upwardly from the absorber through the bottom of the evaporator, an auxiliary loop circuit including a pump and cooling element for circulating the liquid refrigerant in the evaporator, and structure in the evaporator to bypass liquid refrigerant from the evaporator to the absorber when the liquid rises to a predetermined level in the evaporator.

8. In an absorption refrigeration system, a generator, a condenser, an evaporator, an absorber, conduits interconnecting the elements to provide circuits for the circulation of a refrigerant and absorbent, said evaporator overlying the absorber, a standpipe extending upwardly from the absorber through the bottom of the evaporator, said standpipe maintaining a pool of liquid refrigerant in the evaporator while permitting the flow of refrigerant vapor therethrough to the absorber, an auxiliary loop circuit including a pump and cooling element for circulating the liquid refrigerant in the evaporator, and a bypass conduit having one end connected to the absorber and its opposite end extending upwardly into the evaporator to a predetermined height above the bottom thereof whereby liquid refrigerant will overflow through the conduit to the absorber when it rises to a predetermined level in the evaporator.

9. In an absorption refrigeration system, a generator, a condenser, an evaporator, an absorber, conduits interconnecting the elements to provide circuits for the circulation of a refrigerant and absorbent, said evaporator overlying the absorber, a standpipe extending upwardly from the absorber through the bottom of the evaporator, said standpipe maintaining a pool of liquid refrigerant in the evaporator while permitting the flow of refrigerant vapor therethrough to the absorber, an auxiliary loop circuit including a pump and cooling element for circulating liquid refrigerant in the evaporator, and said standpipe having an opening in the side thereof at a predetermined height above the bottom of the evaporator whereby liquid refrigerant overflows from the evaporator to the absorber when it rises to the level of the opening in the standpipe.

10. In an absorption refrigeration system, a generator, a condenser, an evaporator, an absorber, conduits interconnecting the elements to provide circuits for the circulation of a refrigerant and absorbent, said evaporator overlying the absorber, a standpipe extending upwardly from the absorber through the bottom of the evaporator, said standpipe maintaining a pool of liquid refrigerant in the evaporator while permitting the flow of refrigerant vapor therethrough to the absorber, and a bypass conduit having one end extending into the evaporator to a predetermined height above the bottom thereof, the opposite end of said bypass conduit being connected to the system adjacent the base of the generator, whereby liquid refrigerant will overflow from the evaporator and be conducted to the base of the generator when the liquid refrigerant rises to a level above the end of the conduit in the evaporator.

JOHN G. REID, Jr.

REFERENCES CITED

The following references are of record in the file of this patent:

UNITED STATES PATENTS

| Number | Name | Date |
|---|---|---|
| 2,019,290 | Brace | Oct. 29, 1935 |
| 2,099,201 | Getaz | Nov. 16, 1937 |
| 2,272,856 | Thomas | Feb. 10, 1942 |
| 2,282,503 | Thomas et al. | May 12, 1942 |
| 2,298,924 | Bichowsky | Oct. 13, 1942 |
| 2,365,797 | Bichowsky | Dec. 26, 1944 |